April 19, 1927.
W. H. BARTON
1,625,698
PACKING FOR GATE VALVES
Filed Nov. 6, 1926
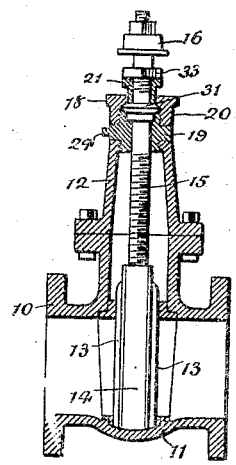
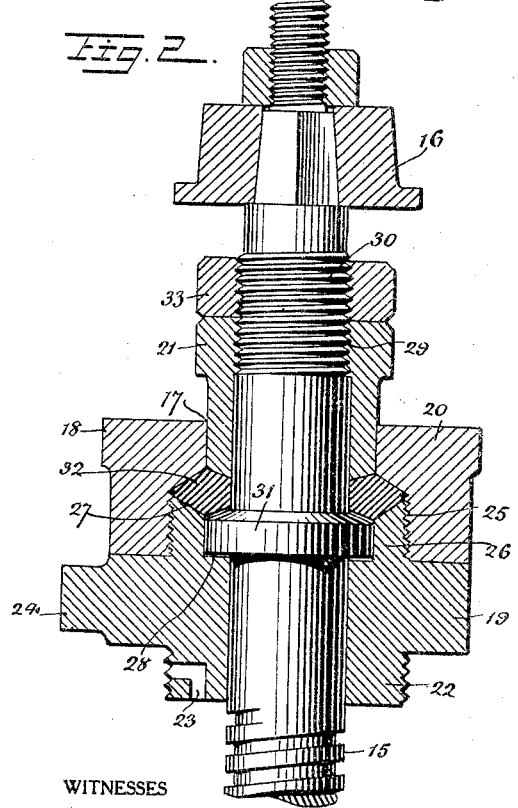
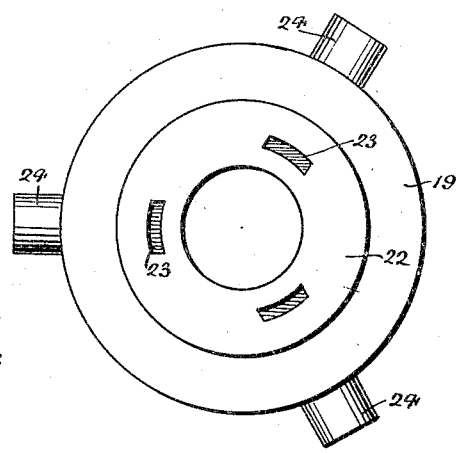
WITNESSES
H. T. Walker
Chris Feinle
INVENTOR
Wm. H. Barton
BY Munn & Co
ATTORNEYS Patented Apr. 19, 1927.

1,625,698

UNITED STATES PATENT OFFICE.

WILLIAM H. BARTON, OF MONTCLAIR, NEW JERSEY.

PACKING FOR GATE VALVES.

Application filed November 6, 1926. Serial No. 146,761.

This invention relates to the class of valves, and has especial reference to stop or gate valves such as are used in connection with water and gas mains.

Some of the objects of the present invention are: to provide a packing means for valves of the indicated character which will be practically self packing; to provide a packing means for valves of the indicated character in which greater facility is had in making repairs to parts, and in replacing parts thereof, and in repacking; to provide a packing means for valves of the indicated character which allows new packing to be provided without requiring a makeshift closure for the valve body, or the alternative of closing the valve and cutting off the flow of water or gas, as the case may be, through the valve; and a packing means which obviates the necessity of removing the valve stem for repacking the packing box.

Another object of the invention is the provision of a packing gland for the stem of a gate valve, which when used in conjunction with a water or gas main allows the packing gland and stem to be removed while associated with each other through an ordinary gate box in case of a leaking gland or bent stem without the necessity of digging up pavement.

The nature of the invention and its distinguishing features and advantages will appear when the following specification is read in connection with the accompanying drawing, in which—

Figure 1 is a sectional view through a stop or gate valve embodying the packing means of the present invention.

Figure 2 is an enlarged sectional view of the packing.

Figure 3 is a view in elevation of the under side of a packing box.

Referring now more particularly to the several views of the drawing, it will be apparent that there has been illustrated a valve 10 which includes a valve body 11 having a bonnet 12, the usual wedges 13 and a gate 14 which co-acts with the wedges 13 and is capable of being moved up and down into and out of the bonnet 12 to opened and closed positions. The gate 11 is shown in a closed position. The gate 14 is moved to its opened and closed position by virtue of a stem 15 having threading action with the gate 14 as the stem is rotated by manipulating the nut 16 at the upper end of the stem 15.

The packing means 17 of the present invention is associated with the upper end of the bonnet 12 and a portion of the stem 15. The packing means 17 includes a packing box 18 which consists of parts 19, 20 and 21. The part 19 is adapted to surround the stem 15 and is provided with a screw threaded portion 22 capable of being threaded in the upper threaded end of the bonnet 12, as shown most clearly in Figure 1. The part 19 also has small passageways 23 which bleed the valve body as the part 19 is being attached. The part 19 also has radial studs 24 for facilitating the application and removal of the means 17 from the bonnet. The part 20 is in the nature of a cap and is internally threaded as at 25 to receive the threaded portion 26 of the part 19. The portion 26 provides a seat 27, and with the main body portion of the part 19 provides a recess 28.

The part 21 is in the form of a gland and is internally threaded as at 29 adapting the part 21 for screw threading adjustment on the screw threaded portion 30 of the stem 15. The stem 15 is provided with a collar or shoulder 31 which is formed integral with the stem 15 and is adapted to be disposed in the recess 28. Suitable packing is arranged in the box 18, and in the present instance, the packing is in the form of a metallic ring 32, preferably of brass. The ring 32 is arranged on the seat 27 and is engaged respectively by portions of the part 20, part 21 and the shoulder 31, as shown most clearly in Figure 2. In order to effectively retain the gland 21 in any desired position of adjustment on the stem 15, there is provided a locking nut 33 adapted for threading action on the portion 30 of the stem 15.

From the foregoing, it will be apparent that the shoulder or collar 31 prevents the stem 15 from having longitudinal movement, and permits the same to be rotated. By rotating the stem 15, the gate 14 may be moved to opened and closed positions; that when the gate 14 is moved to a closed position, further turning movement on the stem 15 will cause the collar or shoulder 31 to tightly bear against the ring 32, and on the other hand, when the gate is moved to the upper limit of its movement to an open position, the top portion thereof will engage the under side of the part 19 and cause the gland 21 to bear tightly against the ring 32, thus preventing leakage around the stem; and that due to the separability of the parts, the packing may be replaced without requiring the closing of the valves, or the removal of the valve stem 15, and the provision of a make-shift closure for the upper end of the bonnet.

It is to be understood that the packing means of the present invention is not to be limited to the application shown in the present instance in connection with a stop valve but that it may be used in conjunction with other closely analogous valves.

Having thus described my invention, I claim:

1. In a valve having a stem, a packing box of separable parts having a packing therein, a shoulder on the stem arranged between a portion of said box and the packing, said packing box including a gland adjustably connected with the stem and removable therefrom and co-active with the packing.

2. The combination in a valve having a casing, of a stem, packing means comprising a box section connected with said casing, a cap section detachably connected with said box section, a packing in said box section and held in place by said cap section, a gland connected with said stem, and a fixed shoulder on said stem, the packing arranged between said gland and shoulder in co-active relationship therewith.

3. The combination in a valve having a casing, of a stem, packing means comprising a box section detachably connected with said casing, a cap section detachably connected with said box section, a packing in said box section and held in place by said cap section, a gland adjustably connected with said stem, and a fixed shoulder on said stem, the packing arranged between said gland and shoulder in co-active relationship therewith.

WILLIAM H. BARTON.